United States Patent
Jung et al.

(10) Patent No.: US 12,341,401 B2
(45) Date of Patent: Jun. 24, 2025

(54) BRUSHLESS DIRECT CURRENT BLOWER MOTOR WITH NOVEL STATOR BLOCK

(71) Applicant: Hyoseong Electric, Co., Ltd., Busan (KR)

(72) Inventors: Jin Gun Jung, Busan (KR); Chi Won Moon, Busan (KR); Seokmin Kim, Busar (KR)

(73) Assignee: Hyoseong Electric, Co., Ltd., Busan (KR)

( * ) Notice: Subject to any disclaimer, the term of this patent is extended or adjusted under 35 U.S.C. 154(b) by 0 days.

(21) Appl. No.: 18/617,903

(22) Filed: Mar. 27, 2024

(65) Prior Publication Data

US 2024/0333084 A1 Oct. 3, 2024

(30) Foreign Application Priority Data

Mar. 29, 2023 (KR) ........................ 10-2023-0041322

(51) Int. Cl.
*H02K 5/22* (2006.01)
*H02K 5/24* (2006.01)

(52) U.S. Cl.
CPC ............... *H02K 5/225* (2013.01); *H02K 5/24* (2013.01)

(58) Field of Classification Search
CPC ............ H02K 5/10; H02K 5/22; H02K 5/225; H02K 5/24; H02K 11/30; H02K 11/33
See application file for complete search history.

(56) References Cited

U.S. PATENT DOCUMENTS

2019/0165643 A1    5/2019    Jung

FOREIGN PATENT DOCUMENTS

| EP | 3674557 A1 * | 7/2020 | ............... H02K 1/12 |
|---|---|---|---|
| FR | 3079369 A1 | 9/2019 | |
| KR | 10-1382036 B1 | 4/2014 | |
| KR | 10-1930245 B1 | 12/2018 | |
| KR | 10-2020-0007145 A | 1/2020 | |
| KR | 10-2183072 B1 | 11/2020 | |
| KR | 10-2212596 B1 | 2/2021 | |

OTHER PUBLICATIONS

Gigliotti, Machine Translation of EP18617903, Jul. 2020 (Year: 2020).*

* cited by examiner

*Primary Examiner* — Eric Johnson
(74) *Attorney, Agent, or Firm* — Revolution IP, PLLC

(57) ABSTRACT

A blower motor includes a motor assembly 100 including a stator assembly 1 comprising a stator core 10, an upper insulator 11 coupled to an upper portion of the stator core 10 and a lower insulator 12 coupled to a lower portion of the stator core 10, a rotor assembly 2 rotating around the stator assembly 1, a stator block 3 to which the stator assembly 1 is coupled, a printed circuit board 4 located at a lower portion of the stator block 3, and a motor cover 5 coupled to the stator block 3; a flange 200; and a damper plate 300.

6 Claims, 8 Drawing Sheets

BRUSHLESS DIRECT CURRENT BLOWER MOTOR WITH NOVEL STATOR BLOCK

BACKGROUND OF THE INVENTION

Technical Field

The present invention relates to a blower motor used in an air conditioning system for a vehicle, etc. More specifically, the present invention relates to a blower motor applying a stator block with a novel structure, thereby facilitating assembly of the motor, effectively dissipating heat generated during operation of the motor and efficiently organizing the grounding structure.

Background Art

In general, vehicles need to introduce hot or cool air thereinto to control the temperature or humidity inside the vehicles, and the air for controlling the temperature and humidity is circulated by rotation of a blower fan. The blower fan is driven by a blower motor.

The blower motor includes a rotor, a stator and a housing accommodating the stator and the rotor. When current is applied to a coil wound around the stator core, the rotor is rotated by electromagnetic interaction with the stator, thereby rotating a fan assembly installed in a rotating shaft of the rotor, to perform air conditioning.

Such blower motors may be confirmed in various prior art which have a structure in which a heat sink is installed in a heating element to dissipate the heat generated during operation of the motor.

Korean Patent No. 10-2212596 discloses a structure of a stator block acting as a heat sink. This prior art has a structure in which the stator block and the printed circuit board are directly coupled to each other so that the heat generated from the devices of the printed circuit board can be effectively dissipated. However, since a bearing for supporting the rotation of the shaft is coupled to the inside of a cylindrical body protruding upwardly from the center of the stator block, the structure of the stator block is complicated and rigidity for supporting the bearing must be ensured. In addition, since guide protrusions corresponding to the inner circumferential surface of the stator core should be formed on the outer circumferential surface of the cylindrical body, the structure of the stator block and the stator core is complicated and assemblability and rigidity of assembly cannot be ensured.

Accordingly, the present invention suggests a blower motor having a stator block with a novel structure capable of improving the assemblability of the stator core and the motor cover of the blower motor, effectively performing heat sink and grounding functions and preventing noise generated inside the motor.

SUMMARY OF THE INVENTION

Task to be Solved

It is an object of the present invention to provide a blower motor having a stator block with a novel structure capable of improving assemblability.

It is another object of the present invention to provide a blower motor with a novel structure capable of improving heat dissipation and grounding functions.

It is yet another object of the present invention to provide a blower motor with a novel structure capable of preventing noise generated inside the motor.

The above and other inherent objects of the present invention may all be easily achieved by the description of the present invention described below.

Means for Solving Task

The blower motor according to the present invention comprises a motor assembly 100 comprising a stator assembly 1 comprising a stator core 10, an upper insulator 11 coupled to an upper portion of the stator core 10 and a lower insulator 12 coupled to a lower portion of the stator core 10; a rotor assembly 2 rotating around the stator assembly 1; a stator block 3 to which the stator assembly 1 is coupled; a printed circuit board 4 located at a lower portion of the stator block 3; and a motor cover 5 coupled to the stator block 3; a flange 200 comprising a flange body 201 having a hole in the center into which the motor assembly 100 is inserted, an upper protrusion 202 having an annular shape protruding upwardly along a periphery of the hole into which the motor assembly 100 is inserted, a damper seating part 203 formed in the shape of a groove on an inner side of the hole of the motor assembly 100, and a plurality of coupling protrusions 204 formed in the shape of protrusions on a lower portion of the flange body 201; and a damper plate 300 comprising an annular body 301 having a ring shape, a plurality of locking parts 302 protruding upwardly from a periphery of the annular body 301 at regular intervals, and a plurality of protrusion guides 303 protruding toward the shaft 21 from a periphery of the annular body 301 at regular intervals, wherein the stator block 3 has a plate 30 having a circular shape and a hollow protrusion 31 protruding upwardly from a central portion of the plate 30, and the stator assembly 1 is coupled to the hollow protrusion 31.

In the present invention, a plurality of protruding couplers 32 may protrude radially from a periphery of the plate 30 at regular intervals, and the protruding coupler 32 may be inserted and fixed to a lower portion of a decoupling part 511 in the motor cover 5.

In the present invention, a plurality of first through holes 33 through which a terminal 121C passes may be formed through vertically around the hollow protrusion 31 of the plate 30.

In the present invention, the blower motor may further comprise a gasket 34 for closing the first through hole 33.

In the present invention, preferably, the gasket 34 has a slit 34A into which the terminal 121C is inserted.

In the present invention, the gasket 34 may have a fixing protrusion 34B inserted into an inner diameter of the first through hole 33.

In the present invention, the plate 30 may have a device groove 35 for receiving a portion in which some devices mounted on the printed circuit board 4 protrude.

Effect of Invention

The present invention has an effect of providing a blower motor with a novel structure capable of improving assemblability, improving heat dissipation and grounding functions, and preventing noise generated inside the motor.

Hereinafter, the present invention will be described in detail with reference to the accompanying drawings.

DETAILED DESCRIPTION OF THE INVENTION

Figure 1:
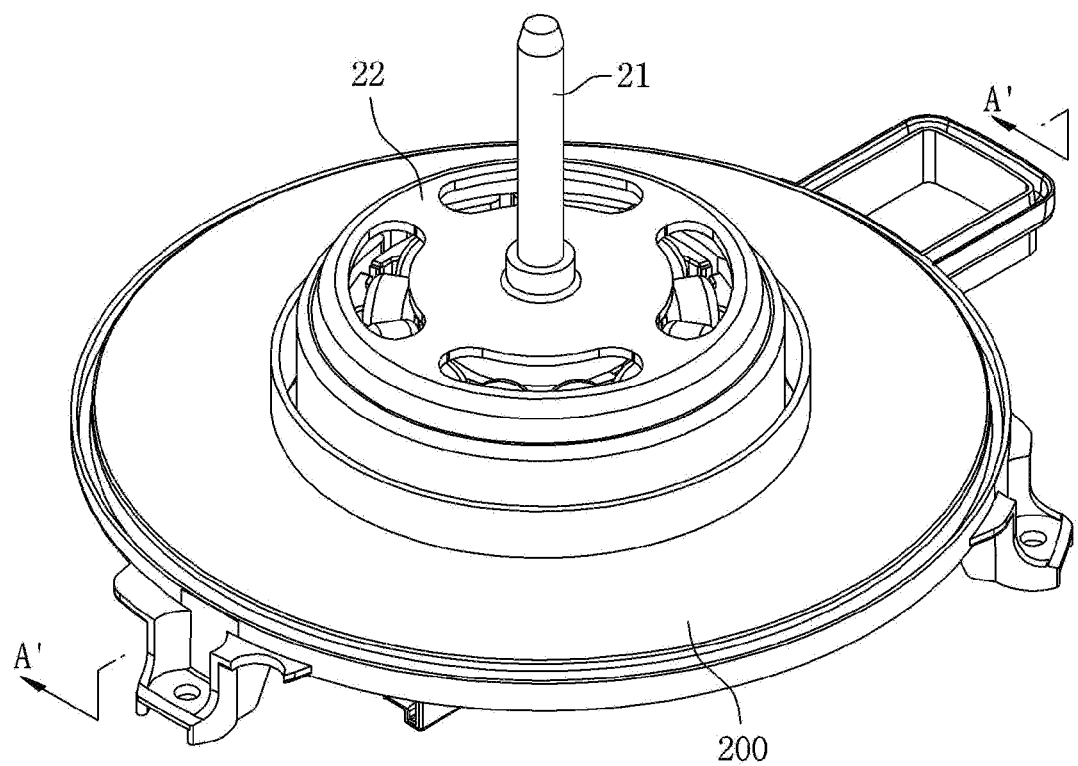
FIG. 1 is a perspective view of a blower motor according to the present invention.
Figure 2:
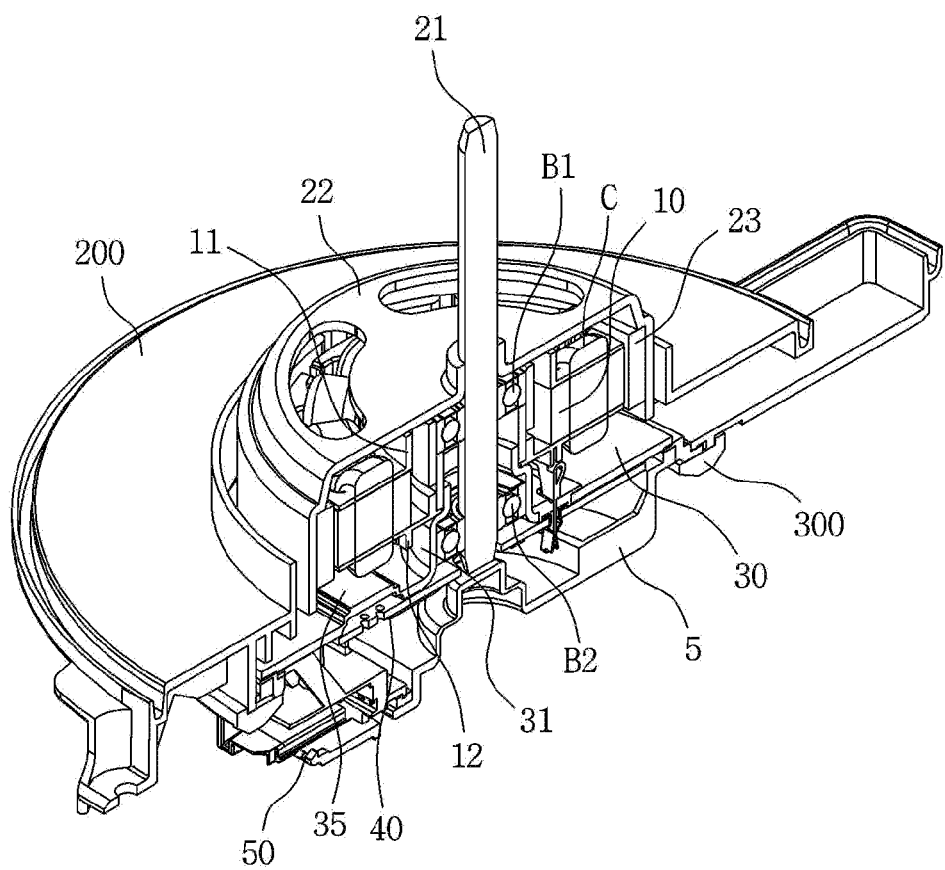
FIG. 2 is a cut-away perspective view of the blower motor in FIG. 1 taken along line A-A'.
Figure 3:
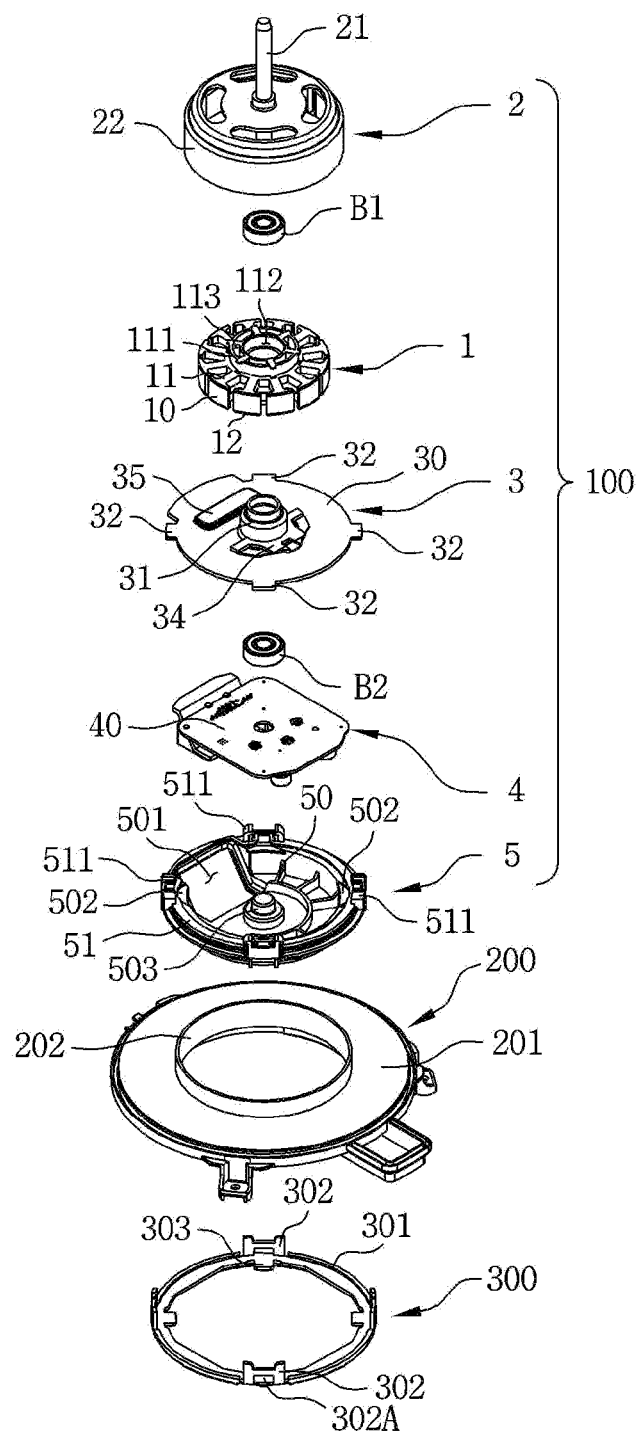
FIG. 3 is an exploded perspective view of a blower motor according to the present invention.
Figure 4:
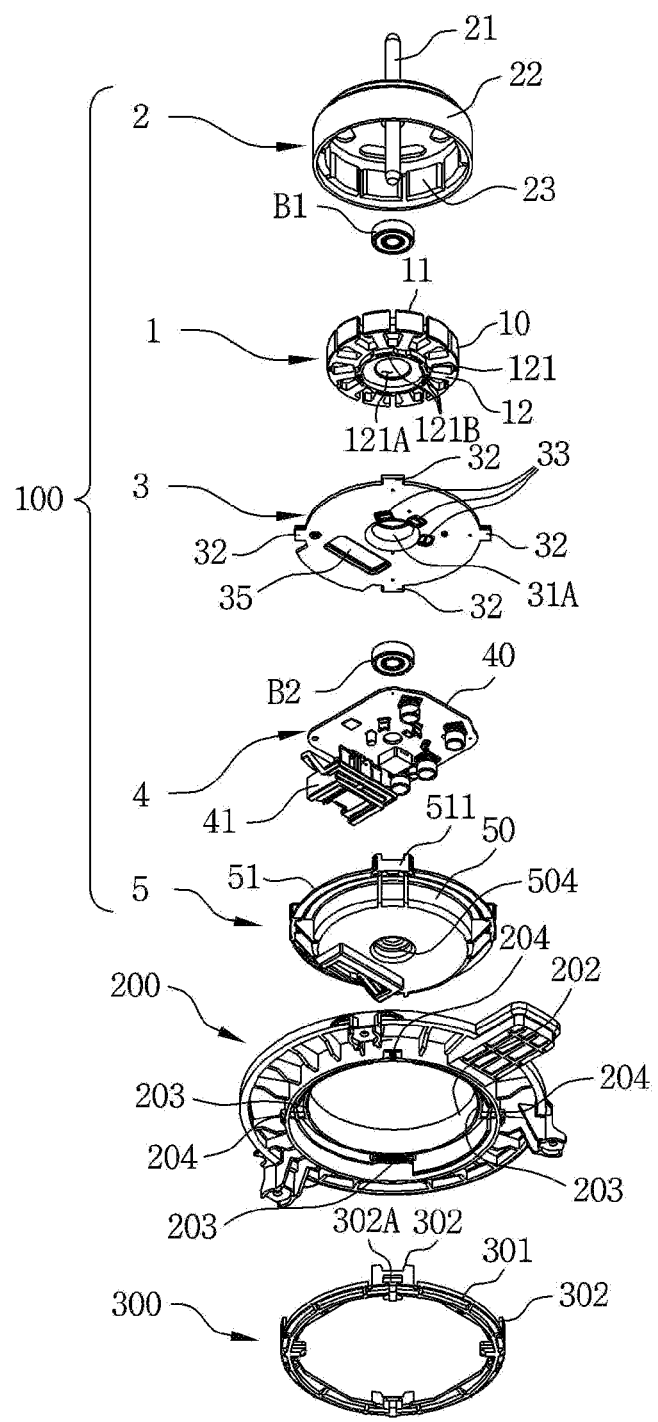
FIG. 4 is a bottom exploded perspective view of a blower motor according to the present invention.

FIG. 1 is a perspective view of a blower motor according to the present invention. FIG. 2 is a cut-away perspective view of the blower motor in FIG. 1 taken along line A-A'. FIG. 3 is an exploded perspective view of a blower motor according to the present invention. FIG. 4 is a bottom exploded perspective view of a blower motor according to the present invention.

As illustrated in FIGS. 1 to 4, the blower motor according to the present invention comprises a motor assembly 100, a flange 200 and a damper plate 300.

The motor assembly 100 comprises a stator assembly 1, a rotor assembly 2, a stator block 3, a printed circuit board 4 and a motor cover 5. The motor assembly 100 is seated on the flange 200, and the damper plate 300 is coupled to the flange 200 to prevent the motor assembly 100 from dislodging.

The stator assembly 1 of the present invention comprises a stator core 10, an upper insulator 11 and a lower insulator 12. The upper insulator 11 is coupled to an upper portion of the stator core 10, and the lower insulator 12 is coupled to a lower portion of the stator core 10. The upper insulator 11 comprises an upper protrusion 111 protruding upwardly from the center, an upper central space 112 formed inside the upper protrusion 111 to be coupled to an upper bearing B1, and a plurality of flow passages 113 formed axially around the upper central space 112.

The lower insulator 12 comprises a lower protrusion 121 protruding downwardly from the center. The lower protrusion 121 comprises a lower central space 121A for coupling a hollow protrusion 31 of the stator block 3, and a plurality of terminal grooves 121B for installing a terminal 121C. A coil C is wound around the stator assembly 1 according to a predetermined pattern. An end of the wound coil is electrically connected to the terminal protruding downwardly from the lower insulator 12.

The rotor assembly 2 comprises a shaft 21, a rotor housing 22 having a cup shape with a lower portion open, to which the shaft 21 is coupled and which rotates with the shaft 21, and a plurality of magnets 23 attached along an inner wall of the rotor housing 22 at regular intervals. The rotor assembly 2 is installed to enclose the stator assembly 1, and is rotated by a changing magnetic field generated by the stator assembly 1. The shaft 21 is rotatably supported by an upper bearing B1 and a lower bearing B2. The upper bearing B1 is installed in an upper central space 112 of the upper insulator 11. The lower bearing B2 is installed in an inner space 31A in the center of the stator block 3.

The stator assembly 1 is coupled to an upper portion of the stator block 3, and the printed circuit board 4 is located at a lower portion of the stator block 3. The stator block 3 comprises a plate 30 having a circular shape, a hollow protrusion 31 protruding upwardly from a central portion of the plate 30, a protruding coupler 32 protruding radially from a periphery of the plate 30 at regular intervals, a first through hole 33 formed through vertically around the hollow protrusion 31 of the plate 30, through which the terminals pass, a gasket 34 for closing the first through hole 33, and a device groove 35 for receiving a portion in which some devices mounted on the printed circuit board 4 protrude. Preferably, the plate 30 is made of aluminum, which has high electrical and thermal conductivity.

The stator assembly 1 is coupled to the hollow protrusion 31 of the stator block 3. The lower bearing B2 rotatably supporting the shaft 21 is coupled to the inner space 31A inside the hollow protrusion 31.

The printed circuit board 4 comprises a substrate 40 on which various devices are mounted, and a connector 41 installed on one side of the substrate 40 to be connected to an external power source. The terminal 121C passing through the plate 30 is electrically connected to circuits on the substrate 40. The circuits on the substrate 40 are physically and electrically connected to the plate 30 of the stator block 3, which allows the circuits to be grounded.

The motor cover 5 comprises a cover part 50 and a packing part 51, and the stator block 3 and the printed circuit board 4 are coupled to an upper portion of the motor cover 5.

The motor cover 5 of the present invention comprises a cover part 50 and a packing part 51. The cover part 50 is formed from a plastic resin injection molded material, and the packing part 51 is made of a material such as rubber, etc. to provide a sealing and buffering function while enclosing a periphery of the cover part 50. In order to form the packing part 51 on the cover part 50, a multiple injection method in which the cover part 50 is placed in an injection mold and subjected to several steps of injection with rubber may be applied.

The cover part 50 has a cup shape in which an upper portion is open. A connector coupling part 501 has a shape in which a portion of one side of the cover part 50 is open, to which a connector 41 is coupled.

Figure 6:
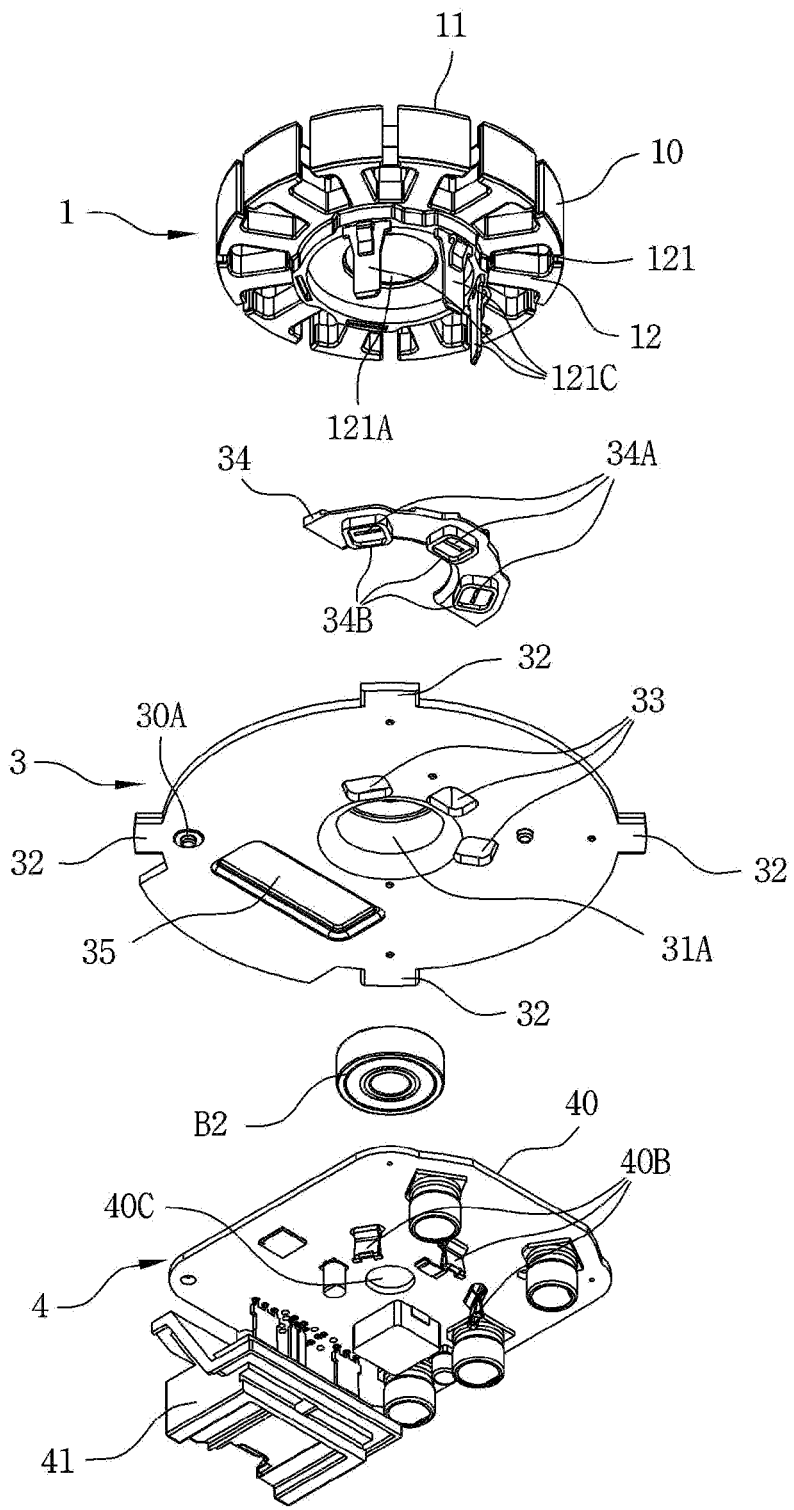
FIG. 6 is a bottom exploded perspective view illustrating a stator assembly, a stator block and a printed circuit board of a blower motor according to the present invention.

The packing part 51 has a flange shape extending outwardly along an upper edge of the cover part 50. A plurality of pairs of decoupling parts 511 protrude upwardly from a periphery of the packing part 51 at regular intervals. FIG. 6 illustrates four pairs of decoupling parts 511 spaced 90 degrees apart, but the number of pairs is not necessarily limited thereto.

A plurality of PCB coupling parts 502 are formed in the shape of a groove on an inner side of an upper surface of the cover part 50 at regular intervals. FIG. 3 illustrates four PCB coupling parts 504 spaced 90 degrees apart, but the number of PCB coupling parts is not necessarily limited thereto.

The central protrusion 503 protrudes upwardly from the center of an inner side of the cover part 50, and an upper surface of the central protrusion 503 supports a lower end of the shaft 21 when the shaft 21 is coupled to the rotor housing 22. At this time, since a lower end of the shaft 21 exerts a force pressing the central protrusion 503, a protrusion of the jig is inserted into the central groove 504 which is opposite the central protrusion 503 to support the central protrusion 503. The central groove 504 has a shape being indented upwardly from the center of an outer side of the cover part 50.

The packing part 51 comprises a decoupling part 511, and preferably, the decoupling part 511 is connected to the packing part 51 as a single member. As described above, the packing part 51 has a structure coupled to a periphery of the cover part 50, and the packing part 51 may be made of a rubber material by multiple injection molding on the cover part 50.

The substrate 40 of the printed circuit board 4 is located in an inner space of the cover body 500, and the connector 41 mounted on the substrate 40 is coupled to the connector coupling part 501.

The decoupling part 511 protrudes upwardly from an outer side of the rim part of the cover part 50. The decoupling part 511 is seated on a damper seating part 203 of the flange 200 to form a decoupling structure between the motor assembly 100 and the flange 200. Accordingly, the vibration generated when the motor assembly 100 is operated may be absorbed by the decoupling damper part 513 to reduce the vibration.

The flange 200 comprises a flange body 201 having a hole in the center, into which the motor assembly 100 is inserted, an upper protrusion 202 having an annular shape protruding upwardly along a periphery of the hole into which the motor assembly 100 is inserted, a damper seating part 203 formed in the shape of a groove at a position corresponding to the decoupling damper part 513 of the motor assembly 100, and a coupling protrusion 204 formed in the shape of a protrusion on a lower portion of the flange body 201 at a position corresponding to a locking part 302 of the damper plate 300.

A portion of the rotor assembly 2 is located inside the upper protrusion 202 to rotate. The decoupling damper part 513 of the motor cover 5 is seated on the damper seating part 230 having a groove shape.

The damper plate 300 has an annular body 301 having a ring shape, a plurality of locking parts 302 protruding upwardly from a periphery of the annular body 301 at regular intervals, and a plurality of protrusion guides 303 protruding toward the shaft 21 from a periphery of the annular body 301 at regular intervals. The locking part 302 has a locking hole 302A, and the locking hole 302A is coupled to a coupling protrusion 204. The locking hole 302A may be modified to have a protrusion shape, and the coupling protrusion 204 may be modified to have a hole or groove shape. The protrusion guide 303 supports the motor cover 5 to prevent the motor assembly 100 from dislodging downwardly.

Figure 5:
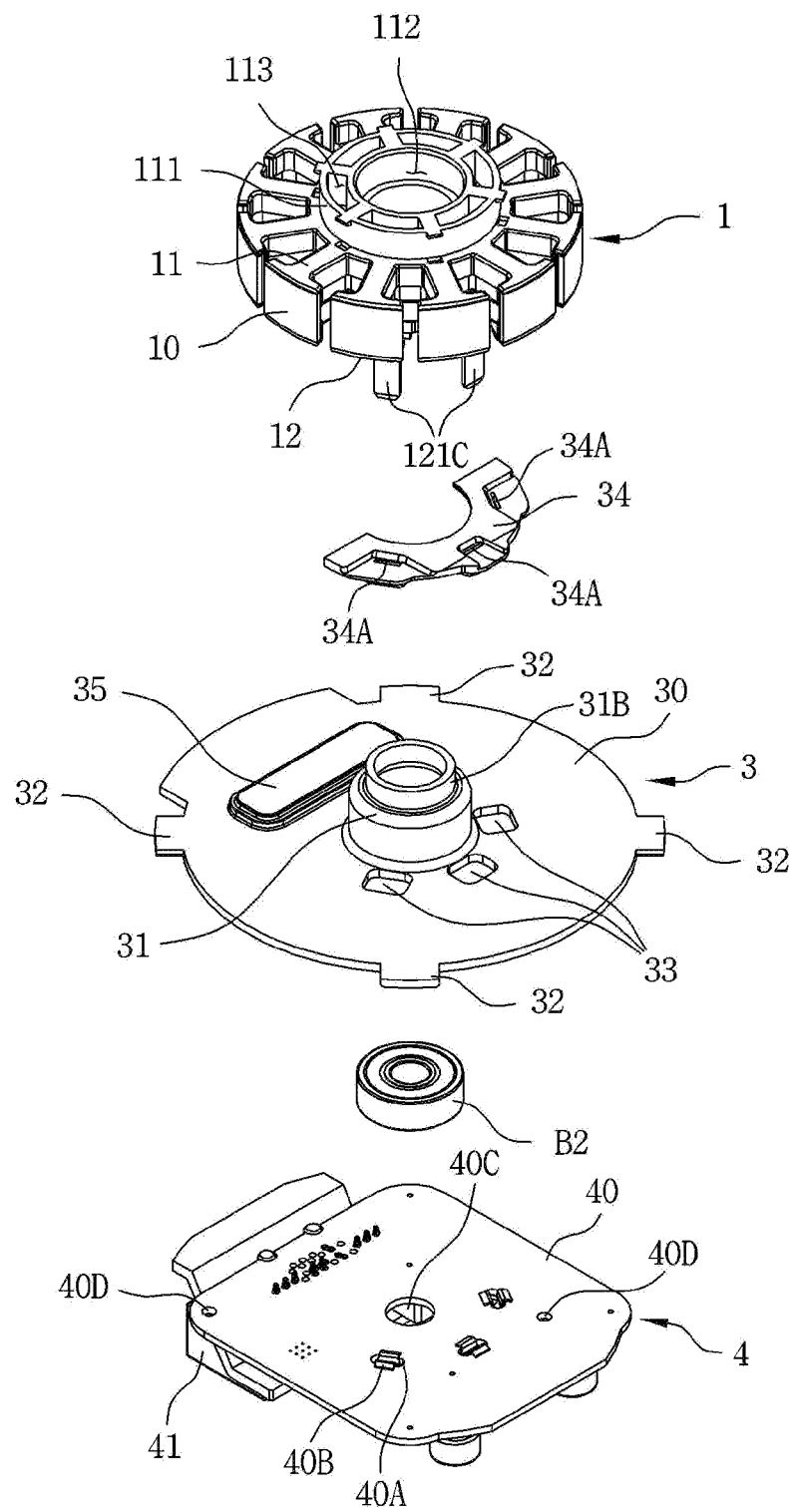
FIG. 5 is an exploded perspective view illustrating a stator assembly, a stator block and a printed circuit board of a blower motor according to the present invention.
Figure 7:
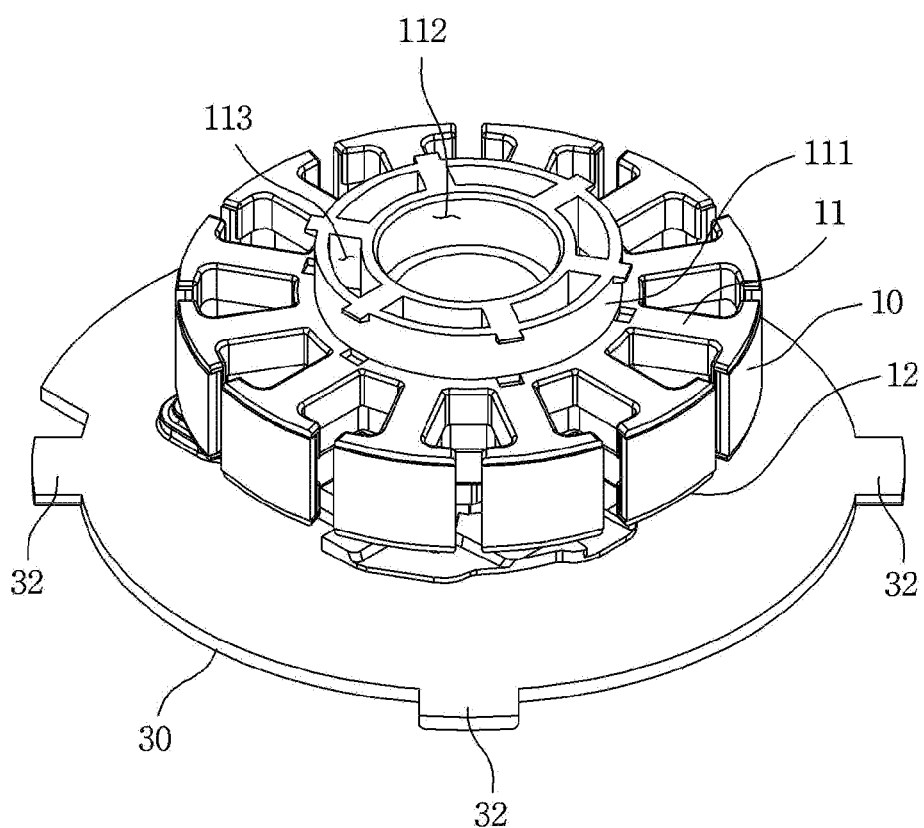
FIG. 7 is a perspective view in which a stator assembly and a stator block of a blower motor according to the present invention are coupled.
Figure 8:
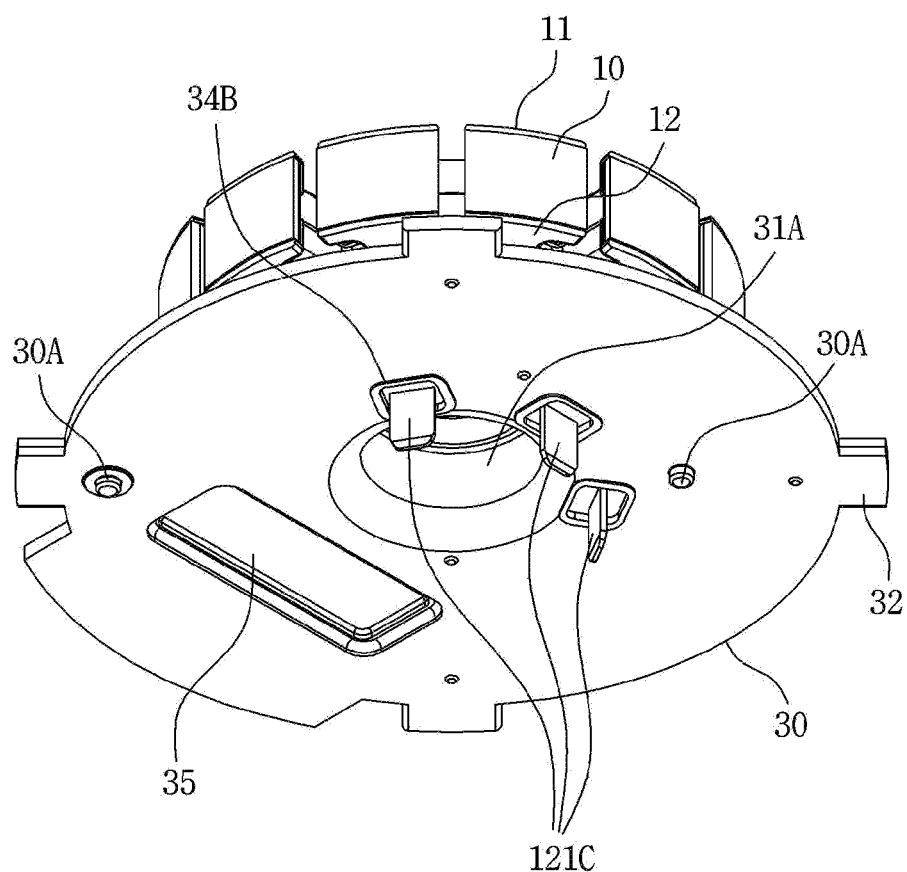
FIG. 8 is bottom perspective view in which a stator assembly and a stator block of a blower motor according to the present invention are coupled.

FIG. 5 is an exploded perspective view illustrating a stator assembly 1, a stator block 3 and a printed circuit board 4 of a blower motor according to the present invention. FIG. 6 is a bottom exploded perspective view of FIG. 5. FIG. 7 is a perspective view in which a stator assembly 1 and a stator block 3 of a blower motor according to the present invention are coupled. FIG. 8 is a bottom perspective view of FIG. 7.

Referring to FIGS. 5 to 7 together, the stator assembly 1 is coupled to an upper portion of the stator block 3 of a blower motor according to the invention, and the printed circuit board 4 is located at a lower portion of the stator block 3.

The stator block 3 comprises a plate 30 having a circular shape. A hollow protrusion 31 protrudes upwardly from a central portion of the plate 30. A protruding coupler 32 protrudes radially from a periphery of the plate 30 at regular intervals. A first through hole 33 is formed through vertically around the hollow protrusion 31 of the plate 30, and a terminal 121C is installed to pass through the first through hole 33. A gasket 34 closes the first through hole 33 and insulates the terminal 121C at the same time.

The hollow protrusion 31 protrudes upwardly from a central portion of the plate 30, and the stator assembly 1 is coupled to an outer circumferential surface of the hollow protrusion 31. The hollow protrusion 31 has a cylindrical shape with a hollow interior, and the hollow interior forms an inner space 31A in which a lower portion is open. A lower bearing B2 is press fitted and coupled to the open lower portion of the inner space 31A.

An upper portion of the hollow protrusion 31 is press fitted and coupled to a lower central space 121A of the stator assembly 1. To this end, an upper end of the hollow protrusion 31 may have an axial diameter part 31B with a reduced diameter formed. The outer diameter of the axial diameter part 31B is set to be smaller than the outer diameter of the hollow protrusion 31, and the outer diameter of the axial diameter part 31B is set to be substantially the same or slightly larger than the inner diameter of the lower central space 121A of the stator assembly 1, allowing the axial diameter part 31B to be press fitted to the lower central space 121A.

The protruding coupler 32 provides a structure allowing the stator block 3 to be coupled to the motor cover 5. The protruding coupler 32 is inserted and fixed to a lower portion of the decoupling part 511 of the motor cover 5. Accordingly, preferably, the number of protruding couplers 32 is set to be the same as the number of decoupling parts 511. The description and drawings of the invention illustrate a structure with four protruding couplers 32, but the number of protruding couplers is not necessarily limited thereto.

The terminal 121C of the state assembly 1 passes through the first through hole 33 in a state where the stator assembly 1 is coupled to the stator block 3. At this time, an empty space is formed between the first through hole 33 and the terminal 121C, and when air passes through the empty space, noise may be generated. Accordingly, a gasket 34 is installed in the first through hole 33. The gasket 34 prevents noise caused by the air flow generated in the first through hole 33 and also prevents the terminal 121C and the plate 30 from being in contact with each other, thereby performing an insulating function. The terminal 121C passing through the first through hole 33 is coupled to a terminal receiving pin 40B in the substrate 40.

The gasket 34 is made of an insulating and elastic material such as rubber. The gasket 34 may be formed by subjecting the plate 30 to insert injection molding. The gasket 34 has a slit 34A into which the terminal 121C is inserted, and a fixing protrusion 34B protruding downwardly around the slit 34A to be inserted into an inner diameter of the first through hole 33 so that the gasket 34 blocks the first through hole 33. The number of slits 34A and fixing protrusions 34B is set to be the same as the number of first through holes 33.

The device groove 35 is formed in the plate 30 for receiving a portion in which some devices mounted on the printed circuit board 4 protrude or a protruding soldered portion of the connector 41.

The printed circuit board 4 comprises a substrate 40. A connector 41 is installed on one side of the substrate 40 to be connected to an external power source. A terminal 121C passing through the plate 30 is electrically connected to circuits on the substrate 40. To this end, the same number of second through holes 40A as that of the first through holes 33 are formed on the substrate 40 at locations corresponding thereto. A terminal receiving pin 40B into which the terminal 121C is inserted is installed in each second through hole 40A so that the coil C wound around the stator assembly 1 is electrically connected to the circuits formed on the substrate 40.

The substrate 40 has a central hole 40C in the center. A lower end of the shaft 21 is located in the central hole 40C, and a central protrusion 503 of the motor cover 5 is located under the lower end of the shaft 21.

A plurality of grounding members 30A protruding downwardly from the plate 30 are coupled to a plurality of alignment holes 40D in an edge of the substrate 40. The grounding portions of the circuits on the substrate 40 are electrically connected by the physical coupling between the grounding members 30A and the alignment holes 40D, to form ground circuits.

The stator block 3 of the present invention forms ground circuits as described above, thereby having a structure capable of protecting the circuits and removing electromagnetic noise. In addition, the stator block 3 serves as a heat sink, and the heat generated from the circuits is thermally conducted through the plate 30 of the stator block 3 and dissipated upwardly from the plate 30. The dissipated heat is discharged upwardly from the stator assembly 1. In particular, the heat may be discharged through the flow passages 113 in the stator assembly 1, thereby enhancing cooling efficiency.

It should be noted that the description of the present invention described above is merely an example for understanding the present invention, and is not intended to limit the scope of the present invention. It should be construed that the scope of the present invention is defined by the appended claims, and all modifications and alternations of the present invention fall within the protection scope of the present invention.

The invention claimed is:

1. A blower motor, comprising:
   a motor assembly (100) comprising a stator assembly (1) comprising a stator core (10), an upper insulator (11) coupled to an upper portion of the stator core (10) and a lower insulator (12) coupled to a lower portion of the stator core (10), a rotor assembly (2) rotating around the stator assembly (1), a stator block (3) to which the stator assembly (1) is coupled, a printed circuit board (4) located at a lower portion of the stator block (3), and a motor cover (5) coupled to the stator block (3);
   a flange (200) comprising a flange body (201) having a hole in the center into which the motor assembly (100) is inserted, an upper protrusion (202) having an annular shape protruding upwardly along a periphery of the hole into which the motor assembly (100) is inserted, a damper seating part (203) formed in the shape of a groove on an inner side of the hole of the motor assembly (100), and a plurality of coupling protrusions (204) formed in the shape of protrusions on a lower portion of the flange body (201); and
   a damper plate (300) comprising an annular body (301) having a ring shape, a plurality of locking parts (302) protruding upwardly from a periphery of the annular body (301) at regular intervals, and a plurality of protrusion guides (303) protruding toward the shaft (21) from a periphery of the annular body (301) at regular intervals,
   wherein the stator block (3) has a plate (30) having a circular shape and a hollow protrusion (31) protruding upwardly from a central portion of the plate (30), and
   the stator assembly (1) is coupled to the hollow protrusion (31),
   wherein a plurality of protruding couplers (32) protrude radially from a periphery of the plate (30) at regular intervals, and the protruding coupler (32) is inserted and fixed to a lower portion of a decoupling part (511) in the motor cover (5), and
   wherein the locking parts (302) are coupled to the coupling protrusions (204) and the protrusion guide (303) of the damper plate (300) supports the motor cover (5) to prevent the motor assembly (100) from dislodging downwardly.

2. The blower motor of claim 1, wherein a plurality of first through holes (33) through which a terminal (121C) passes are formed through vertically around the hollow protrusion (31) of the plate (30).

3. The blower motor of claim 2, further comprising a gasket (34) for closing the first through hole (33).

4. The blower motor of claim 3, wherein the gasket (34) has a slit (34A) into which the terminal (121C) is inserted.

5. The blower motor of claim 4, wherein the gasket (34) has a fixing protrusion (34B) inserted into an inner diameter of the first through hole (33).

6. The blower motor of claim 1, wherein the plate (30) has a device groove (35) for receiving a portion in which some devices mounted on the printed circuit board (4) protrude.

* * * * *